United States Patent
Pendleton et al.

(10) Patent No.: US 7,249,076 B1
(45) Date of Patent: Jul. 24, 2007

(54) METHOD FOR PROVIDING CREDIT OFFERING AND CREDIT MANAGEMENT INFORMATION SERVICES

(75) Inventors: Mark R. Pendleton, Atlanta, GA (US); Krishnakumar Srinivasan, Marietta, GA (US)

(73) Assignee: CompuCredit Intellectual Property Holdings Corp. III, Las Vegas, NV (US)

( * ) Notice: Subject to any disclaimer, the term of this patent is extended or adjusted under 35 U.S.C. 154(b) by 1226 days.

(21) Appl. No.: 09/855,134

(22) Filed: May 14, 2001

(51) Int. Cl.
*G06Q 40/00* (2006.01)

(52) U.S. Cl. .......................... 705/35; 705/36; 705/37; 705/38; 705/39; 705/40

(58) Field of Classification Search ................. 705/35, 705/36–40
See application file for complete search history.

(56) References Cited

U.S. PATENT DOCUMENTS 5,262,941 A * 11/1993 Saladin et al. ............ 705/38
5,274,547 A * 12/1993 Zoffel et al. .............. 705/38
6,119,103 A *  9/2000 Basch et al. .............. 705/35
2004/0199456 A1* 10/2004 Flint et al. ................ 705/38

OTHER PUBLICATIONS

John Downes "Dictionary of Finance and Investment Terms." Barrons Educational Series, Inc. Hauppauge, NY: 1998 (p. 128).*
Kenneth Parkinson, Joyce R Ochs. "Using Credit Screening to manage credit risk." Business Credit. New York: Mar. 1998. vol. 100, Iss. 3; p. 22, 5 pgs.*
PR Newswire. Customers Overwhelmingly Think 'Lending Tree' When They Search for Loans Online. New York: Oct. 4, 2000 p. 1.*

* cited by examiner

*Primary Examiner*—Richard E. Chilcot, Jr.
*Assistant Examiner*—Timothy M. Harbeck
(74) *Attorney, Agent, or Firm*—Thomas, Kayden, Horstemeyer & Risley

(57) ABSTRACT

The present invention is related to a method for issuing a credit card to a customer in combination with providing credit management information services for the customer. The exact terms of the credit account offered depend on the creditworthiness of the customer. The customer also receives credit management information services including information as to what actions the customer could take to improve the customer's credit rating and improve the terms of the credit account. After a credit account is issued to the customer, the customer receives additional and on-going credit management information services, including credit management information based on the customer's use of the credit account.

39 Claims, 4 Drawing Sheets

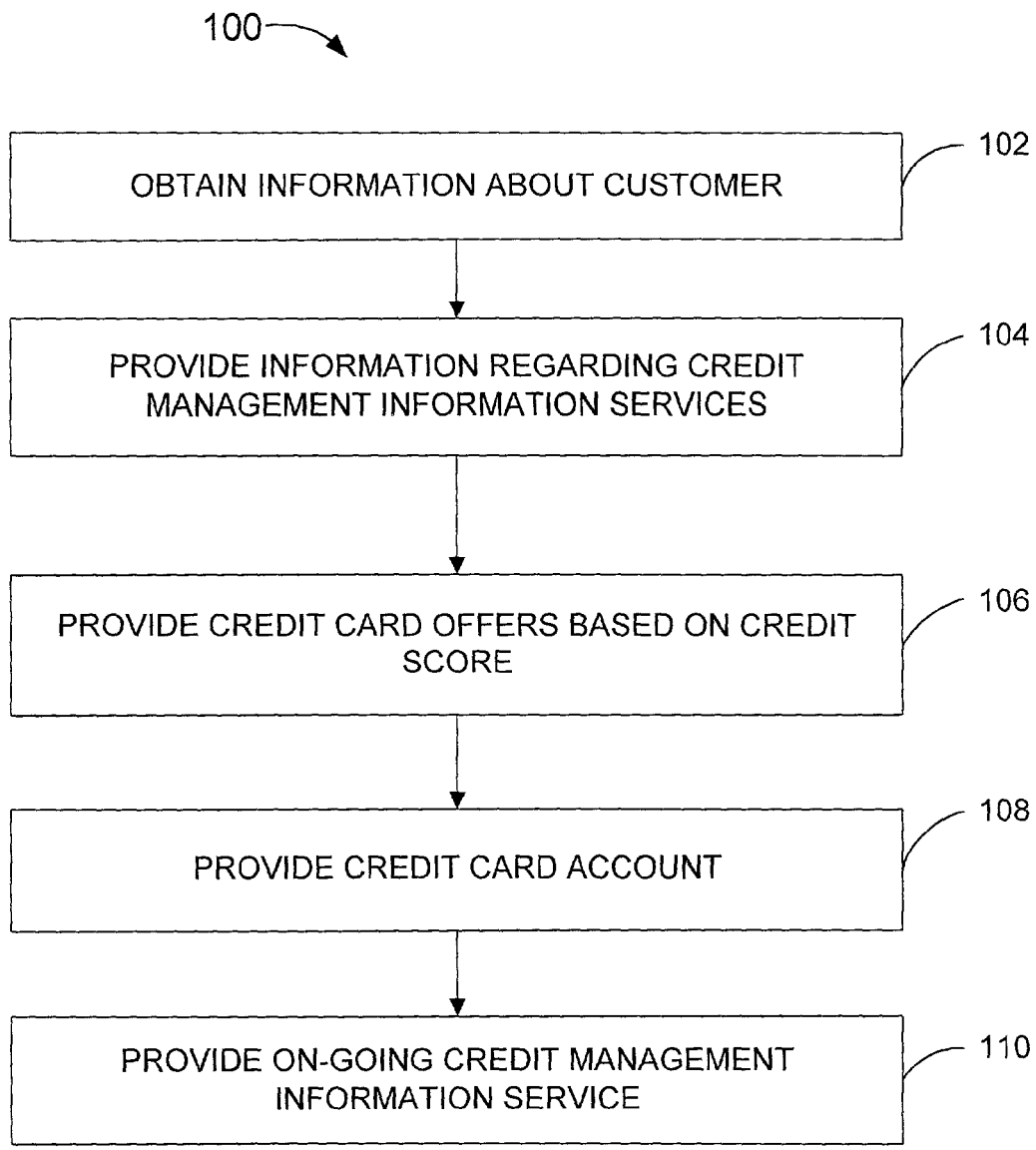

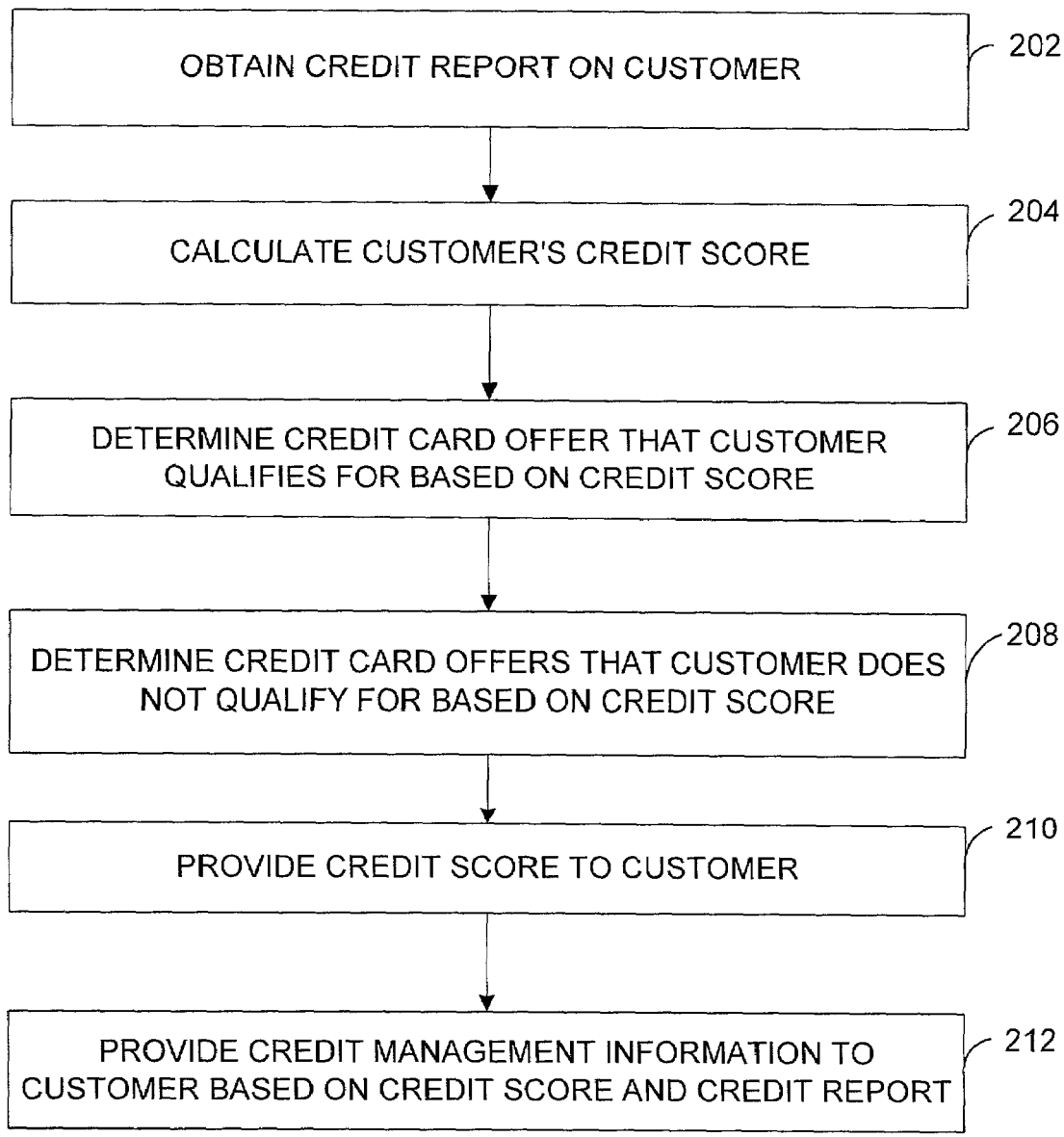

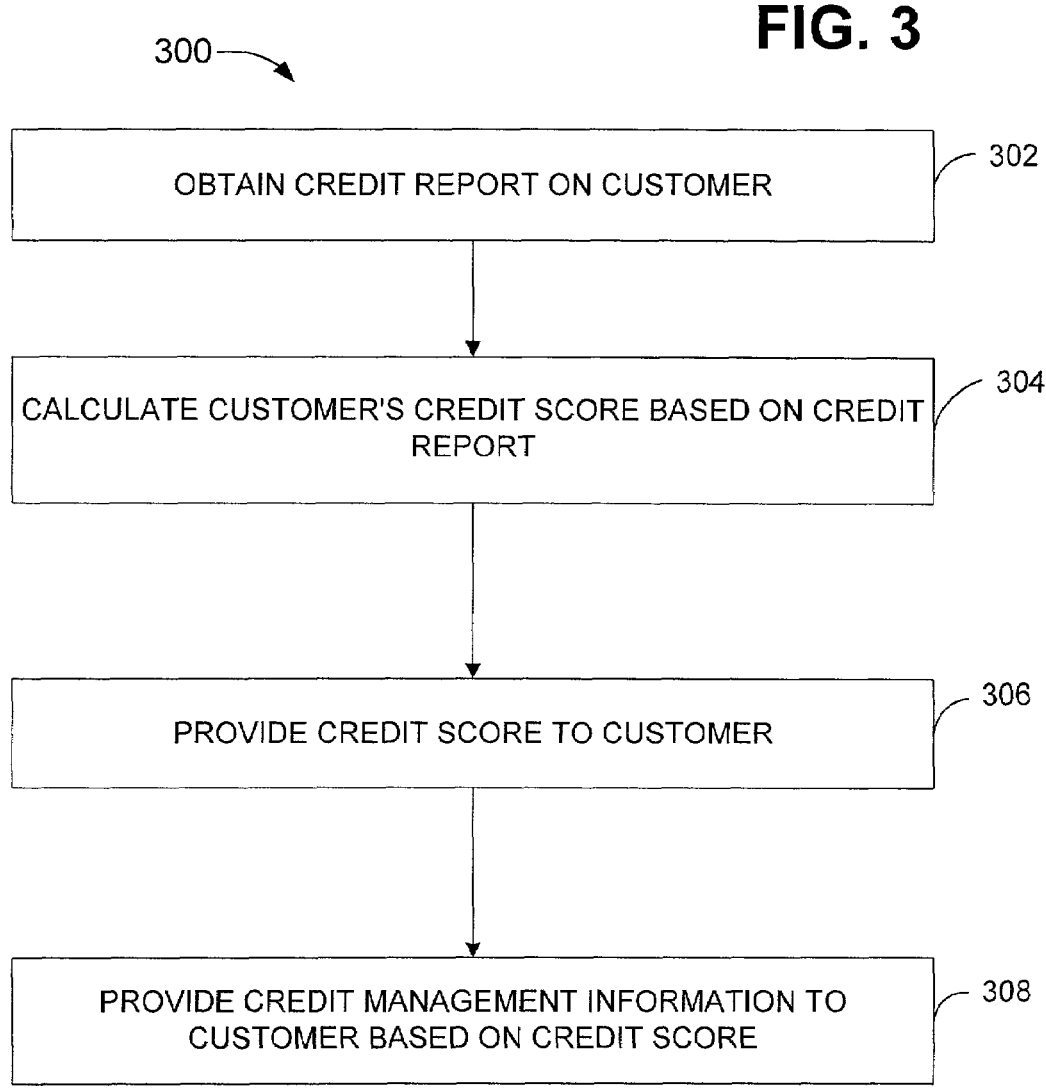

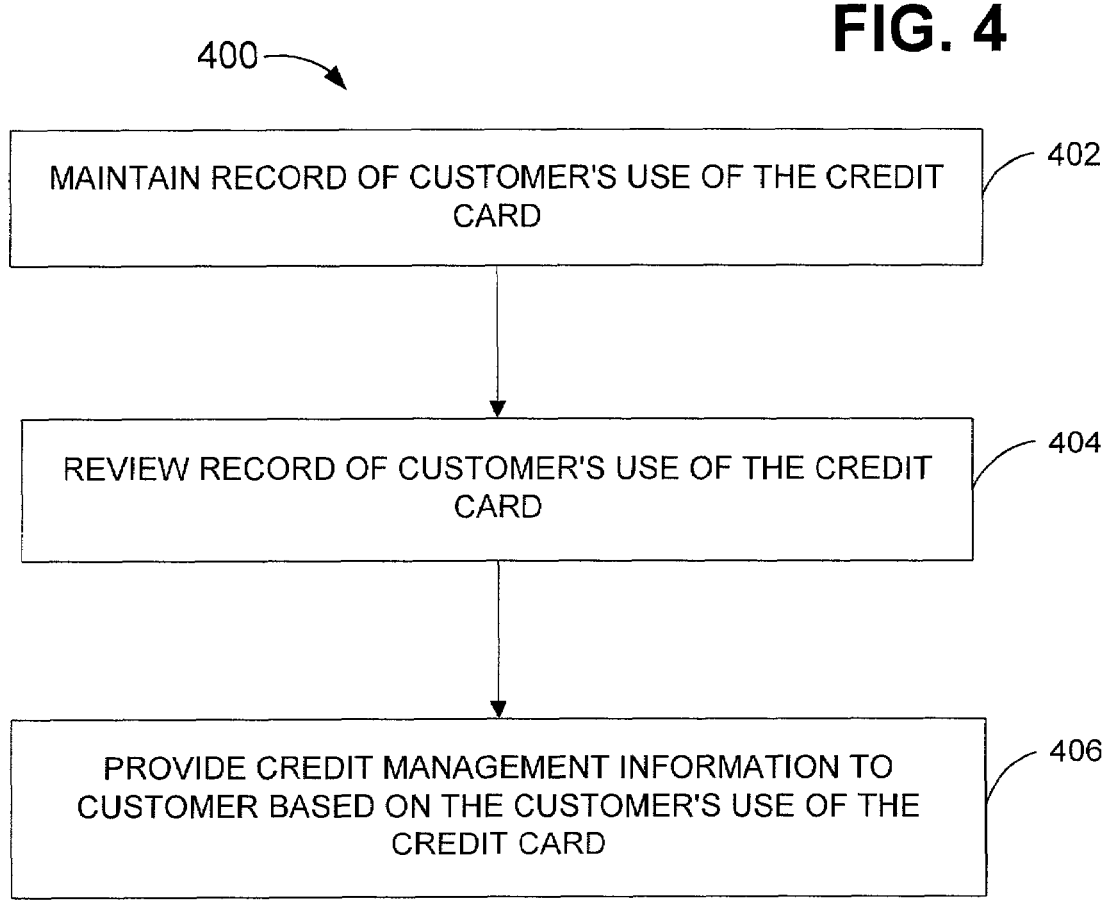

METHOD FOR PROVIDING CREDIT OFFERING AND CREDIT MANAGEMENT INFORMATION SERVICES

BACKGROUND OF THE INVENTION

The present invention relates generally to a financial business method, and particularly to a method for providing a credit offering in combination with credit management information services.

In general, banks provide credit cards to individuals wherein the individual is granted a certain limit of credit, for a certain annual fee, to be paid back at a certain annual interest rate. In return, the cardholder agrees to pay accumulated charges and interest according to the terms of the credit card. The exact terms of the credit card offering to an individual depend on the credit rating of the individual. In general, the better an individual's credit rating, the more favorable credit card offer the individual will receive.

As is known, one approach sometimes taken by financial institutions in a credit offering is to offer, for example through a mailing, an individual a pre-approved line of credit, at an inflated interest rate. If the individual does not accept the offer at the inflated interest rate within a predetermined period of time, then a subsequent credit offering may or may not be made at a lower interest rate, or at otherwise more favorable terms.

Once an individual has obtained or established a credit account, regardless of the manner established, the credit account terms generally remain fixed unless the individual takes proactive measures. It is known that individuals may contact a financial institution, with which the individual has a credit account, and request more favorable terms, particularly if the individual has held the account for some time. However, absent proactive measures by the individual, the terms of the account generally remain fixed.

Various commercial services provide credit counseling to individuals for a fee. These commercial services may provide an individual with a credit rating or some other indication of the individual's creditworthiness at that instant in time. However, none of these services or credit card companies provide individuals with complimentary tools for credit management in combination with a credit card account. Additionally, the commercial credit services are limited in that they provide only an indication of the creditworthiness of an individual at an instant in time, rather than on an on-going basis. Finally, the commercial credit services cannot guarantee that the individual will receive better terms as a result of their services.

Therefor there is a need for a method addressing these and other related and unrelated problems.

SUMMARY OF THE INVENTION

In general, an embodiment of the present invention is a novel method that combines a credit offering with ongoing credit management information services to a customer. In one embodiment, the invention is directed to a method for issuing a credit card account to a customer in combination with continuing credit management information for the customer. Customers are solicited by various means and a credit card account is offered to the customer, wherein the exact terms of a credit card account offer depend on a credit score of the customer. The customer receives credit management information including, among other things, a credit report, a credit score indicating how the customer's credit score compares to other credit scores, credit card account offers that the customer qualifies for based on his credit score, as well as credit card account offers that the customer does not qualify for based on his credit score. Further, the customer receives information as to what actions the customer could take to improve the credit report and/or credit score.

The customer selects one of the credit card accounts offered and a credit card account is created for the customer. After the credit card account is created for the customer, the customer receives additional and on-going credit management information services. The on-going credit management information service includes credit management information specifically based on the customer's use of the credit card account. This unique follow-up credit management information service enhances customer satisfaction, and therefor strengthens customer loyalty and demand.

BRIEF DESCRIPTION OF THE SEVERAL VIEWS OF THE DRAWINGS

The accompanying drawings incorporated in and forming a part of the specification illustrate several aspects of the present invention, and together with the description, serve to explain the principles of the invention.

FIG. 1 is a flow chart representation of selected steps performed in one implementation of one embodiment of the present invention.

FIG. 2 is a flow chart representation of selected steps performed in one implementation of the step of providing credit management information service of FIG. 1 in one embodiment of the present invention.

FIGS. 3–4 are flow-chart representations of selected steps performed in one implementation of the step of providing on-going credit management information service of FIG. 1 in one embodiment of the present invention.

Reference will now be made in detail to the description of the invention as illustrated in the drawings. While the invention will be described in connection with these drawings, there is no intent to limit it to the embodiments disclosed therein.

DETAILED DESCRIPTION OF THE INVENTION

Turning now to the drawings, wherein like reference numerals designate corresponding parts throughout the drawings, FIG. 1 is a flow chart representation of selected basic steps 100 performed in one implementation of one embodiment of the present invention. Credit information is first obtained about a customer desiring a credit card account (Step 102). This information may be obtained in a variety of methods, including solicitation of customers via direct mail, telemarketing, or advertising, or through implementation of the present invention on an Internet web site, which may be contacted by a customer using the Internet or by other means. The information may also be obtained directly from the customer, or through databases or other services, with or without the customer's knowledge and/or input.

The elements of the present invention may be implemented in any combination of the preceding methods, however, for the purposes of clarity, only one such implementation will generally be discussed hereafter. In the preferred embodiment, information regarding the present invention is directly mailed to customers, and the customers provide requested information by filling out an application. (Step 102)

Once the information is obtained from the customer (Step 102), the customer is provided initial credit management information (Step 104) as well as a credit card account offer (Step 106).

Turning first to the step of providing initial credit management information (Step 104), FIG. 2 is a flow chart representation of selected basic steps 200 performed in one implementation of the provision of credit management information services (Step 104, FIG. 1). After obtaining the information about the customer, an initial credit report is obtained on the customer (Step 202). The credit report may be obtained from any of a number of available services and may be obtained in a variety of ways, including but not limited to, mail, through the Internet, or through a variety of other means of transferring the information.

Once the credit report is received (Step 202), a credit score is calculated based on the customer's credit history, which may or may not include application information (Step 204). The credit score may be determined by any of a variety of formulas for determining creditworthiness by assessing various risk factors, including the "FICO" score of Fair, Isaac and Company, or any other credit scoring formula which would be known to one of reasonable skill in the art. The customer's credit score is calculated (Step 204) by using a formula to assess various risk factors, including those reflected in the credit report obtained on the customer (Step 202) and assessing the customer's creditworthiness. In a preferred embodiment, a credit score will be calculated (Step 204) on a 100 point scale, however other scales may be used.

Based on the credit score calculated for the customer (Step 204), a determination is made of what credit card account offers the customer qualifies for based on the credit score (Step 206). The credit card account offers considered may vary in different terms, including but not limited to, card type, interest rate, annual fee, account opening fees, account maintenance fees, balance transfer options, credit limit, etc. Additionally, the credit card account offers considered may be offers for credit card accounts that are financed by a third-party financial institution, including, but not limited to a bank, or may be multiple different credit card account offers from multiple different financial institutions. In one embodiment, the credit card account offers that the customer qualifies for (Step 206) may all be credit card account offers from one third-party financial institution.

Additionally, the determination may be made as to what credit card account offers that the customer does not qualify for based on the credit score (Step 208). The credit card account offers considered in Step 208 may be offers for credit card accounts that are financed by third-party financial institutions, or may be multiple different credit card account offers from multiple different financial institutions.

The calculated customer credit score (Step 204) is provided to the customer (Step 210). Credit management information services are provided to the customer based on the credit score (Step 212). Various information will be provided the customer regarding the credit score (Step 212), including, for example, specific measures that the customer can take to improve the customer's credit score, specific instances or factors in the customer's credit history that affect the credit score, etc. In a preferred embodiment, the factors impacting the customer's credit score are provided in a list to the customer, with the factor having the most negative impact on the customer's credit score at the top of the list, followed by the factor having the next highest negative impact on the customer's credit score. In addition, in the preferred embodiment, actions that the customer may take to correct or reduce the impact of each factor on the customer's credit score is provided to the customer. The above information may be provided in any number of manners, including but not limited to mailing the information to the customer, allowing the customer to access the information on a computer via the Internet, etc.

As depicted in FIG. 1, after the step of providing credit management information services to the customer (Step 104), the customer is provided with credit card account offers for which the customer qualifies (Step 106). In one embodiment, the same entity providing the credit management information will also provide the credit card account and will extend the credit card account offers (Step 106). It should be appreciated that this unity between the credit offering entity and the credit management information entity provides several advantages, including, but not limited to, certainty and/or opportunity for the customer. Specifically, in traditional credit counseling scenarios, a credit counselor may advise a customer on steps the customer may take to improve his credit rating. However, credit counselors are not in a position to guarantee what specific impact that the improved credit rating will have. The unity between the credit offering entity and credit management information entity of one embodiment of the present invention permits certain opportunities and/or assurances. For example, a customer may be advised that if he closes a certain existing credit account (even a stable account), then the new credit account offering my be obtained at a specific (lower) interest rate.

In another implementation, a third-party financial institution will provide the credit card account to the customer. The third-party financial institution may have a collaborative agreement or arrangement with the credit management information services entity, whereby certain assurances may be made by the credit management information services entity, including assurances regarding credit card account terms, and these assurances will be honored by the financial institution. In this embodiment, the customer will be provided with the third-party financial institution application form for the credit card account, through, for example, the mail, or on a web site that the customer may contact through the Internet. Alternatively, the customer's information may be forwarded to the financial institution without the need for a separate application for the credit card account, via mail, the Internet, or other means of transferring the information to the financial institution.

After receiving the credit card account offer (Step 106), and providing any additional information needed, the customer is provided with a credit card account (Step 108). In one embodiment, the same entity providing the credit management information services will also provide and maintain the credit card account. In another implementation, a third-party financial institution may provide the credit card account to the customer (Step 108). In this embodiment, the third-party financial institution will issue the credit card account to the customer, and the credit card account may be either secured or unsecured.

As further depicted in FIG. 1, after the credit card account is provided to the customer (Step 108), credit management information services are provided to the customer on an on-going basis (Step 110). Preferably, there is no separate or additional charge for the on-going credit management information services. The additional, on-going credit management information services (Step 110) provides the customer with more than just a one-time "snapshot" of the customer's credit score at a particular date and time. In one embodiment, the customer may receive periodic additional credit reports, as part of the on-going credit management information (Step 110). Further, the knowledge and security (on the part of the customer) that these credit management information services will be provided on an on-going basis enhances customer demand and strengthens customer loyalty.

FIG. 3 is a flow chart representation of selected basic steps 300 performed in one implementation of one embodiment of the on-going credit management information services (Step 110, FIG. 1). As depicted in FIG. 3, after the credit card account has been provided to the customer (Step 108, FIG. 1), additional credit reports may be obtained on the customer (Step 302). In the preferred embodiment, a credit report may be obtained on the customer (Step 302) at six month intervals. Additionally, in one implementation, the customer's credit score may be determined by assessing various risk factors, including the credit report (Step 304). This credit score may be provided to the customer along with the credit report (Step 306, Step 308). In addition, in one implementation, credit management information may be provided to the customer along with the credit report, detailing steps the customer may take to improve the credit score (Step 308). Periodic credit reports and corresponding credit management information provided to the customer as reflected in the steps 300, may provide on-going information to the customer regarding their current credit status, and will allow the customer to see the impact, if any, of the customer following the credit management information provided (Step 308; Step 110, FIG. 1). Further, in one implementation, as part of the on-going credit management information services (Step 308; Step 110, FIG. 1), the customer may be provided different and/or more favorable account terms, including but not limited to, card type, annual percentage rate, annual fee, credit limit, etc. The different account terms would be related to the current credit status of the customer.

In another implementation, the on-going credit management information services (Step 110, FIG. 1) may include specific management information regarding the use of the credit card account. FIG. 4 is a flow chart representation of selected basic steps 400 performed in one implementation of one embodiment of the on-going credit management information services (Step 110, FIG. 1). As depicted in FIG. 4, the entity providing the credit management information service may maintain records detailing the customer's use of the credit card account (Step 402). Alternatively, in another embodiment, the financial institution issuing the credit card account may maintain the records detailing the customer's use of the credit card account. These records may be maintained in a variety of fashions, including, for example, on any computer readable medium on a stand alone computer, or as part of a computer network including a local area network (LAN), on a web site on the Internet, or any other network of computers. Additionally, the records may be kept in any sort of non-electronic or electronic filing system.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples, a non-exhaustive list, of the computer readable medium would include the following: an electrical connection (electronic) having one or more wires, a portable computer diskette (magnetic), a random access memory (RAM) (magnetic), a read only memory (ROM) (magnetic), and erasable programmable read only memory (EPROM or Flash memory) (magnetic), an optical fiber (optical), and a portable compact disk read only memory (CD-ROM) (optical). Note that the computer readable medium could even be paper or other suitable medium upon which the program is printed, as a program can be electronically captured, via for instance optical scanning of the paper or other medium, then compiled, interpreted, or otherwise processed in a suitable manner if necessary, and then stored in a computer memory.

At periodic times, the records of the customer's use of the credit card account will be reviewed (Step 404). In a preferred embodiment these records will be reviewed every quarter, or at three month intervals. However, based upon certain activities of the customer, the customer's account could be reviewed even more frequently and the customer could, on a more frequent basis, receive credit management information and/or different account terms. In this embodiment, credit management information to the customer, based on the customer's use of the credit card account in the past quarter or three month interval, may be provided to the customer (Step 406). This credit management information may include calculating a credit score based on the customer's use of the credit card account and providing the score to the customer. In a preferred embodiment the credit score is on a 100 point scale, but other scales may be used.

Additional information that may be provided along with a credit score includes, but is not limited to, the card type, the annual percentage rates, annual fees, credit limits, application fees, account opening fees, balance transfer options, etc., that correspond to each credit score on the scale, including the customer's credit score. Additionally, in one implementation, credit management information will be given to the customer concerning how to improve the customer's credit score. In this implementation, the information will be based on the customer's use of the credit card account as reflected in the records maintained on the credit card account (Step 402). The on-going credit management information service (Step 110) depicted in the embodiment of the steps 400 of FIG. 4 allows the customer to see how the use of the specific credit card account affects the credit score, and allows the customer to see the impact that using the credit management information has on the credit score. Further, in one implementation, as part of the on-going credit management information services (Step 406; Step 110, FIG. 1), the customer may be provided different and/or better account terms, including but not limited to, card type, annual percentage rate, annual fee, credit limit, etc. The different account terms would be related to the current credit status of the customer reflected in the customer's use of the credit card account.

In concluding the detailed description, it should be noted that it would be obvious to those skilled in the art that many variations and modifications can be made to the preferred embodiment(s) described above without substantially departing from the principals of the present invention. All such variations and modifications are intended to be included herein within the scope of the present invention, as set forth in the following claims.

The invention claimed is:

1. A method for offering credit and providing information on managing credit, the method comprising the steps of:
    obtaining credit information about a customer;
    obtaining a credit report on the customer;
    determining a credit score for the customer, the credit score being based in part on the credit report;
    providing initial credit management information to the customer, the initial credit management information being based on the credit report, and the initial credit management information being directed at improving the credit score of the customer;

providing a credit account to the customer, the credit account being based on the credit score;

reviewing a record of the use of the credit account by the customer;

obtaining further credit reports on the customer, the further credit reports being obtained at set time intervals during the duration of the credit account;

providing additional credit management information to the customer, the additional credit management information being based on the record of the use of the credit account, the further credit reports, and additional credit offers for which the customer, the record of the use of the credit account includes at least: amount and type of specific transactions made by the customer using the credit account and the customer's payment history;

wherein a single institution performs the steps of providing initial credit management information to the customer, providing a credit account to the customer, providing additional credit management information to the customer, and wherein the additional credit offers for which the customer qualifies are extended from the single institution and include at least: credit offers with differing terms relative to terms of the credit account.

2. A method for providing a credit account and providing information on managing a credit account, the method comprising the steps of:

providing initial credit management information service to a customer;

providing a credit account to the customer; and providing additional credit management information services to the customer, wherein the additional credit management information services are provided by an entity with an affiliation with an entity that provides the credit account and an entity that provides the initial credit management information service to the customer, and wherein the additional credit management information services include offers for additional credit accounts for which the customer qualifies, the offers for additional credit accounts having terms that differ relative to the credit account and are extended from the entity that provides the credit account or the entity with the affiliation with the entity that provides the credit account.

3. The method of claim 2, further comprising the step of obtaining information from a customer.

4. The method of claim 2, wherein the step of providing initial credit management information service comprises obtaining a credit report of the customer.

5. The method of claim 4, wherein the step of providing initial credit management information service further comprises providing the credit report to the customer.

6. The method of claim 5, wherein the step of providing initial credit management information service further comprises determining a credit score for the customer.

7. The method of claim 6, wherein the step of providing initial credit management information service further comprises providing the credit score to the customer.

8. The method of claim 7, wherein the step of providing initial credit management information service further comprises providing information to the customer on how to improve the credit score.

9. The method of claim 6, wherein the step of providing initial credit management information service further comprises determining at least one credit account offer for which the customer does not qualify, wherein the at least one credit account offer is a credit account offer available from the entity providing the credit account.

10. The method of claim 9, wherein the step of providing initial credit management information service further comprises providing information to the customer as to why the customer does not qualify for the at least one credit account offer.

11. The method of claim 2, wherein the step of providing a credit account to the customer comprises determining at least one credit account offer for which the customer qualifies, wherein the at least one credit account offer is a credit account offer available from the entity providing the credit account.

12. The method of claim 11, wherein the step of providing a credit account to the customer further comprises enabling the customer to obtain the credit account.

13. The method of claim 2, wherein the entity providing the additional credit management information services and the entity that provides the credit account are the same entity.

14. The method of claim 2, wherein the step of providing additional credit management information services to the customer comprises obtaining at least one additional credit report of the customer.

15. The method of claim 14, wherein the step of providing additional credit management information services to the customer further comprises obtaining the additional credit report of the customer at periodic intervals.

16. The method of claim 15, wherein the step of providing additional credit management information services to the customer further comprises providing the additional credit report to the customer.

17. The method of claim 16, wherein the step of providing additional credit management information services to the customer further comprises providing information to the customer on how to improve the creditworthiness of the customer.

18. The method of claim 14, wherein the step of providing additional credit management information services to the customer further comprises maintaining a record of the use of the credit account.

19. The method of claim 18, wherein the step of providing additional credit management information services to the customer further comprises determining a score based on the record of the use of the credit account, the record of the use of the credit account including at least: the amount and type of specific transactions made by the customer using the credit account and the customer's payment history.

20. The method of claim 19, wherein the step of providing additional credit management information services to the customer further comprises providing the score to the customer.

21. The method of claim 20, wherein the step of providing additional credit management information services to the customer further comprises providing the score to the customer at periodic intervals.

22. The method of claim 21, wherein the step of providing additional credit management information services to the customer further comprises providing the customer with information on additional credit account terms and credit account offers that correspond with the score if the score is different from a previously calculated score corresponding to the customer.

23. The method of claim 21, wherein the step of providing additional credit management information services to the customer further comprises providing the customer with information on credit account terms that correspond to a plurality of credit scores other than the credit score.

24. The method of claim 21, wherein the step of providing additional credit management information services to the customer further comprises providing information on specific measures the customer can employ to improve the credit score.

25. The method of claim 2, wherein the step of providing additional credit management information services to the customer further comprises providing to the customer improved account terms for the credit account if the customer's current creditworthiness qualifies the customer for improved account terms.

26. A method for providing a credit account and providing information on managing a credit account, the method comprising the steps of:
   providing a credit account to the customer;
   providing on-going credit management information services to the customer for the credit account, wherein the on-going credit management information services are provided by an entity with a relationship with an entity providing the credit account, and wherein the on-going credit management information services includes additional credit offers for which the customer qualifies, the additional credit offers having terms that differ relative to the credit account and are extended from the entity that provides the credit account or the entity with the relationship with the entity that provides the credit account.

27. The method of claim 26, wherein the step of providing a credit account to the customer comprises determining at least one credit account offer for which the customer qualifies, wherein the at least one credit account offer is a credit account offer available from the entity providing the credit account.

28. The method of claim 27, wherein the step of providing a credit account to the customer comprises enabling the customer to obtain the credit account.

29. The method of claim 26, wherein the step of providing on-going credit management information services to the customer comprises obtaining at least one additional credit report of the customer.

30. The method of claim 29, wherein the step of providing on-going credit management information services to the customer further comprises obtaining the additional credit report of the customer at periodic intervals.

31. The method of claim 30, wherein the step of providing on-going credit management information services to the customer further comprises providing the credit report to the customer.

32. The method of claim 31, wherein the step of providing on-going credit management information services to the customer further comprises providing information on specific measures the customer can employ to improve the credit report.

33. The method of claim 26, wherein the step of providing on-going credit management information services to the customer further comprises maintaining a record of the use of the credit account, wherein the record of the use of the credit account includes at least: amount and type of specific transactions made by the customer using the credit account and the customer's payment history.

34. The method of claim 33, wherein the step of providing on-going credit management information services to the customer further comprises providing a score to the customer, the score comprising a number relating to the creditworthiness of the customer.

35. The method of claim 34, wherein the step of providing on-going credit management information services to the customer further comprises providing the credit score to the customer at periodic intervals.

36. The method of claim 35, wherein the step of providing on-going credit management information services to the customer further comprises providing the customer with information on additional credit account terms and credit account offers that correspond with the score, wherein the additional credit account offers are extended from the entity providing the credit account.

37. The method of claim 36, wherein the step of providing on-going credit management information services to the customer further comprises providing the customer with information on credit account terms that correspond to a plurality of scores other than the score.

38. The method of claim 37, wherein the step of providing on-going credit management information services to the customer further comprises providing information on specific measures the customer can employ to improve the score.

39. The method of claim 26, wherein the step of on-going credit management information services to the customer further comprises providing different account terms for the credit account.

\* \* \* \* \*